H. L. DOHERTY.
PROCESS OF HEATING AND APPARATUS THEREFOR.
APPLICATION FILED JULY 2, 1913.
1,222,741.
Patented Apr. 17, 1917.
4 SHEETS—SHEET 3
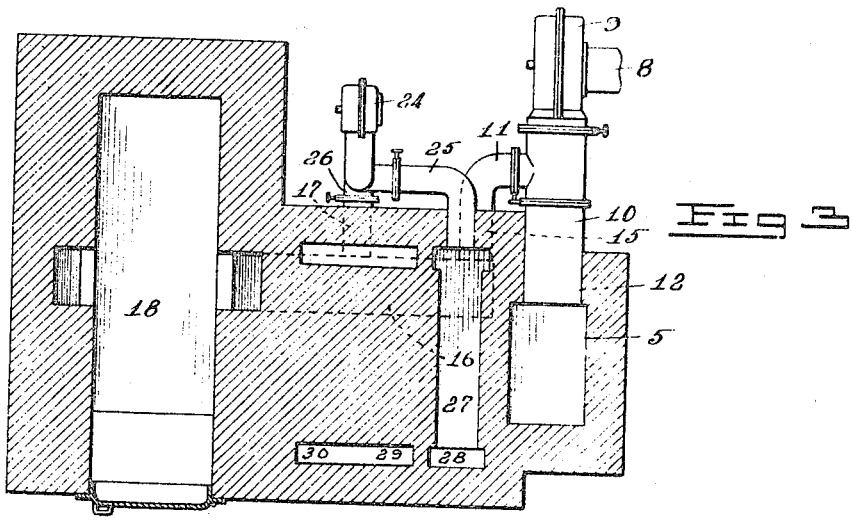
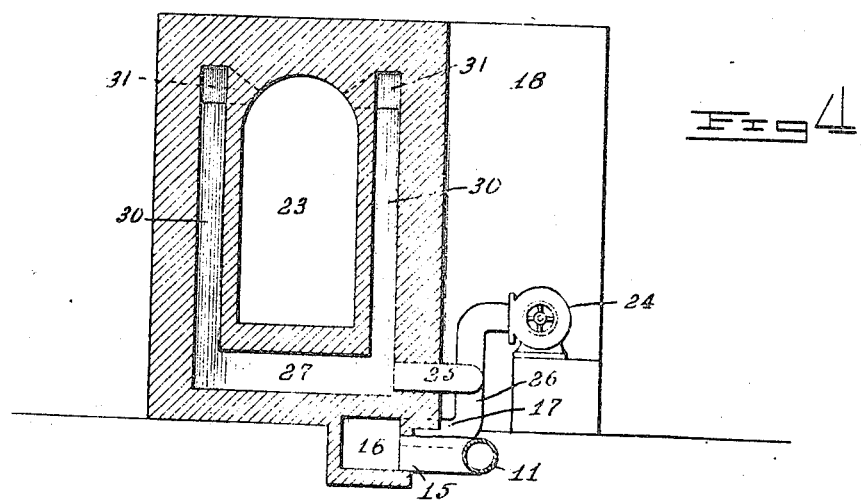

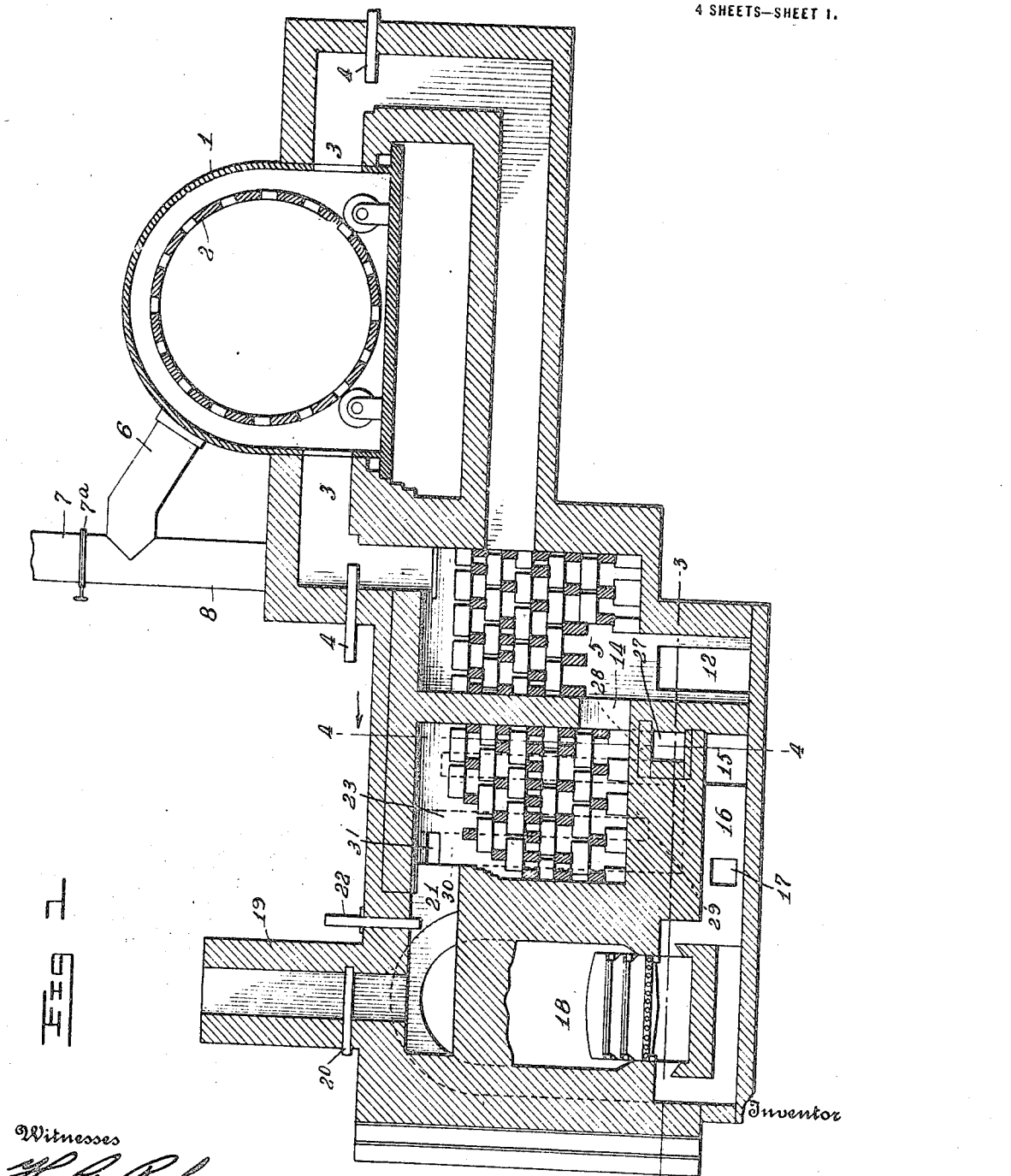

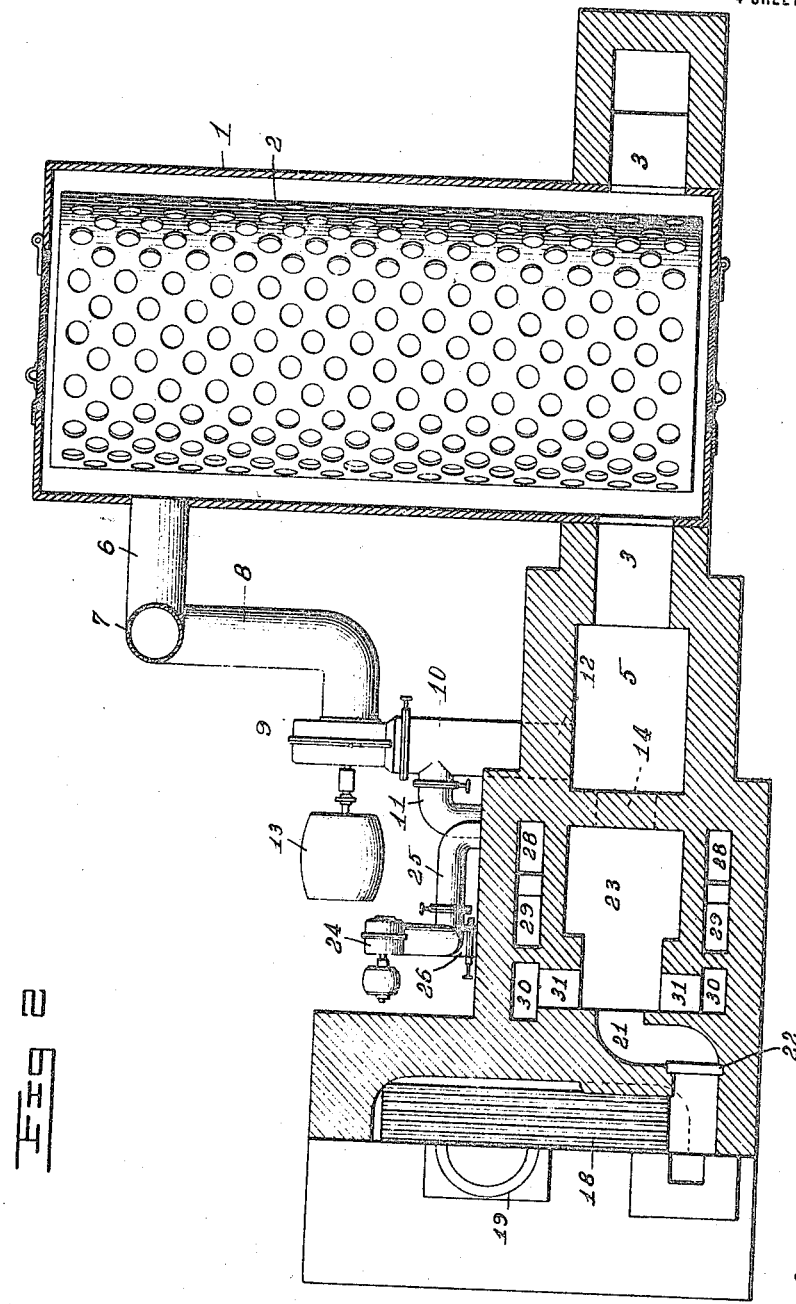

H. L. DOHERTY.
PROCESS OF HEATING AND APPARATUS THEREFOR.
APPLICATION FILED JULY 2, 1913.
1,222,741.
Patented Apr. 17, 1917.
4 SHEETS—SHEET 4.
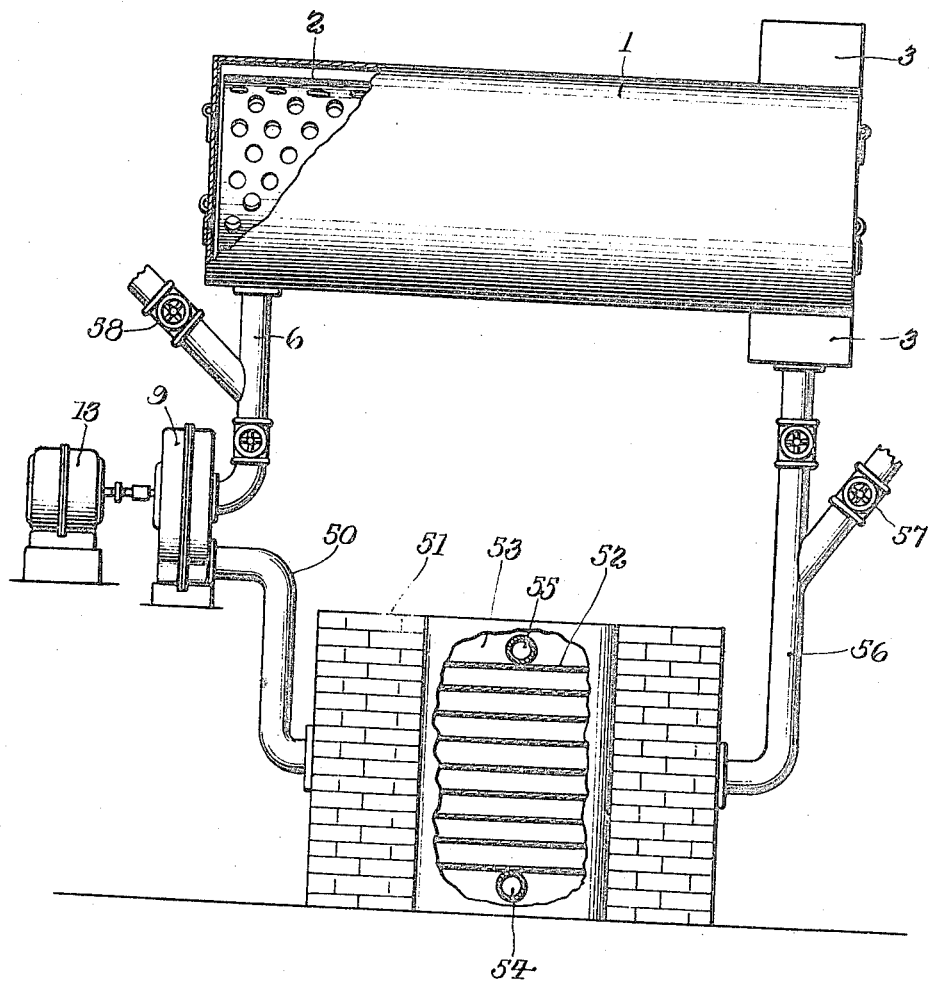

UNITED STATES PATENT OFFICE.

HENRY L. DOHERTY, OF NEW YORK, N. Y., ASSIGNOR TO THE IMPROVED EQUIPMENT COMPANY, OF NEW YORK, N. Y., A CORPORATION OF COLORADO.

PROCESS OF HEATING AND APPARATUS THEREFOR.

1,222,741.  Specification of Letters Patent.  Patented Apr. 17, 1917.

Application filed July 2, 1913. Serial No. 776,959.

*To all whom it may concern:*

Be it known that I, HENRY L. DOHERTY, a citizen of the United States, residing at New York, in the county of New York and State of New York, have invented certain new and useful Improvements in Processes of Heating and Apparatus Therefor, of which the following is a specification.

This invention relates to processes of heating and apparatus therefor; and it comprises a method of heating objects in an atmosphere of chemically adjusted character wherein a body of hot products of complete combustion is maintained flowing in a closed circuit, or cyclically, through a container for such objects and through a device wherein the temperature plane of such body is elevated sufficiently to compensate for the cooling taking place in such container; and it also comprises an organization of apparatus elements embracing a container for objects to be heated and treated, an inlet conduit for hot gases, an outlet conduit for gases, means for venting a portion of gases from the outlet conduit, means for producing uniform, heated products of combustion, means for introducing the said heated products to replace the vented portion of the original products, means for thoroughly admixing the introduced portion of products of combustion with the residue of the products of combustion and means for returning the admixture to and through the container, together with certain details of such means; all as more fully hereinafter set forth and as claimed.

In many technical operations it is a desideratum to treat materials in a heated atmosphere of inert, or of indifferent chemical character maintained at a given temperature plane with considerable uniformity; the object in such cases being to heat merely without producing chemical changes. For example, in preparing tin cans for treatment to recover the tin, in removing the solder, etc., it is desirable to heat simply without any oxidation or reduction and at, in this case, a comparatively low temperature. Many other cases may be cited. Application of heat directly in such cases is difficult since flame and gases from fuel burning furnaces generally are not uniform in character and usually carry an excess of oxygen. If the flame is run reducing in the effort to avoid this excess of oxygen, it is always sooty and soot is always disadvantageous in heating processes. Indirect heating by currents of air, of steam, etc., in many cases cannot be used by reason of the chemical action incident thereto.

It is the object of the present invention to provide a simple process allowing the heating of any desired object to any definite point within a rather wide temperature range, without necessary oxidation or reduction, and with an economical use of fuel. To this end I provide a container for the objects to be heated and through this container I produce a cyclic circulation of hot products of combustion, of adjusted temperature and composition and, usually, of inert character. In each pass in the cycle I vent a portion of the gases flowing from the container and replace them with another portion of products at a higher temperature. The amounts vented and the amounts added in each pass are usually relatively small as compared with the cyclically circulating body of heated gases. The usual object is to add merely enough hot new gas to replace the number of heat units which may have been lost in heating up the objects, by radiation, etc. Operating in this manner I can, by a suitable method of operation, attain many economies in fuel. Obviously, I need burn only enough fuel to keep pace with the loss of heat units; and by maintaining the body of gases circulating in closed circuit of sufficient volume, I in effect maintain a sort of "dominant pool" preventing temperature fluctuations.

It is not a matter of indifference how the products of combustion are prepared. In all fuel burning furnaces, the efflux gases are stratified and are not uniform in composition; there are always strata and streaks of unchanged air. Naturally if such products are used for the present purposes they must be thoroughly mixed in some manner. It is better to produce the products in a special way and particularly since in operating in this way sundry economies in fuel can be attained.

I therefore provide at one point in the cycle a mixer and homogenizer which may be a simple checker chamber, and into this mixer I introduce products of combustion formed in another chamber which may also be a checker chamber. In the second chamber, which serves merely as a combustion device, I produce products of combustion from producer gas; preferably a gas of a rather lean character, carrying, say, about 90 B. T. U. This producer gas I may form in the usual ways or by running a mixed draft of air and products of combustion through a deep body of fuel, the products of combustion in this case being a portion of hot products from the cyclic flow. I thereby utilize the heat of a portion of the gases which I must vent in each pass. Of course, in the operation of a producer with a mixed draft of this character, sensible heat may be converted into combustible gas by the well known reaction wherein $CO_2$ is reduced to CO by C with an absorption of heat. The air is usually supplied in a heated state. The gas from the producer is taken to the combustion chamber wherein it is treated or burnt with about the correct proportion of air to make inert or indifferent products of combustion. While it is difficult to burn gas ordinarily with the exact amount of air necessary for combustion, yet by passing such a mixture through a hot checker chamber under the accelerating action of the hot surfaces, a complete combustion and an inert effluent can be readily obtained with a short length of travel. Obviously should I wish to maintain a slightly oxidizing or a slightly reducing atmosphere in the container for the objects, I may make the main circulating body of heated gas of such a composition by varying the ratio between air and gas at this point in the initial combustion. For example, I may at this point use a 10 per cent. excess of air or a 10 per cent. excess of gas. With producer gas there is no danger of sooting, even if the current be run reducing.

In the accompanying illustration I have shown, more or less diagrammatically, an embodiment of apparatus elements within the purview of this invention and susceptible of use in the performance of the described process. In this showing Figure 1 is a vertical section of a complete apparatus for treating material, the receptacle for the material being shown as a rotary drum;

Fig. 2 shows a horizontal section of the same;

Fig. 3 is a horizontal section along line 3—3 of Fig. 1;

Fig. 4 is a detail vertical section along line 4—4 of Fig. 1; and

Fig. 5 is a view, partly in elevation and partly in section, of a modified form of apparatus passing the circulating body of gases through a special reheating device.

In Fig. 1, element 1 is a container housing containing a rotary perforated drum 2. At the base of the housing on each side enter conduits 3 controlled by dampers 4. These conduits 3 lead from a checker chamber 5. The function of this checker is merely that of a mixer and homogenizer, it not being intended to use it as a heat accumulating device although by virtue of its heat-storing power it does operate to average out fluctuations in the temperature of the currents going through it. At the outer end of the housing is a gas outlet conduit 6 leading to a stack 7, dampered at 7ᵃ. Communicating with this stack is another conduit 8 leading to fan 9. (See Fig. 2). On the pressure side of this fan is a valved conduit 10 having valved branch 11. Conduit 10 leads through port 12 back into the homogenizing device. Motor 13 drives the fan. With the apparatus so far described, the gas can be kept in rapid cyclic circulation to and through the casing and the material therein, and to and through the fan and homogenizer back to the casing; a portion of the gas in each pass being vented through chimney 7 and branch conduit 11.

The fresh hot products of combustion to replace the amount vented enter the homogenizer through conduit 14.

The portion of products of combustion taken away from the main circulation through 11 pass through port 15 into conduit 16 where they are joined by air from port 17 and pass upward through producer 18, shown only diagrammatically. The producer is provided with a stack 19 dampered at 20, this stack being for use in starting. Producer gas is led off through conduit 21, dampered at 22, into combustion chamber 23. Air fan 24 (Fig. 2) supplies secondary air for burning gas in combustion chamber 23 to valved conduit 25 and primary air for feeding the gas producer to valved conduit 26. The primary air enters conduit 16 through 17 and passes with the products of combustion through the gas producer in a well known way. The secondary air (from 25) enters cross flue 27 and, as shown, passes upward through parallel vertical flues 28, one on each side, to a cross-over, thence downward through 29 to another cross-over and thence upward through 30 to nostrils 31.

The use of the apparatus described is obvious from the foregoing. The material to be heated is charged into drum 2 which is started in rotation by any suitable means (not shown). A homogeneous body of hot products of combustion enters through 3 and passes through container casing 1 and drum 2 to outlet 6. From outlet 6 a minor portion of the gas is vented at 7 and sent to waste. The residue of the gases which have been cooled a little by contact with the material, but are still hot, is taken through 8 by fan 9. The fan discharges the main body of gas through 10 and 12 into the homogenizing checker chamber 5, whence it is returned through 3 into 1 and 2, passing in cyclic circulation. Another minor fraction of the hot gases from 9 is used to form the endothermic draft component in operating producer 18. This portion passes through 11 and 15 into draft conduit 16, where it is joined by primary air from fan 24. The admixture goes through 18 in a well-understood way, forming combustible gas. This combustible gas, damper 22 being open as much as may be desired, passes through 21 into the second checker 23. Hot secondary air, warmed by its zig-zag upward and downward passage through the chamber walls, enters through nostrils 31 to burn the current of gas. As stated, this secondary air may be in the exact proportion for combustion, or in slight excess, or in slight deficit, this depending on whether the circulating gas body may be desired to be run as wholly inert, as slightly oxidizing, or slightly reducing. For most uses under the present invention it is desirable to have it wholly inert. The burning gas and air pass down through the checker chamber 23 and combustion is completed therein. In this invention, this checker chamber is merely a homogenizing and combustion-completing device and is not a heat storing device, at least not to any extent. The products of combustion pass through 14 and join the cyclically circulating body of gas passing through 5, 3, 1, 6, 8 and 10. The amount of new products of combustion thus added should be exactly that necessary to replace the portion vented at 7 and that taken through 11 to form a component of the producer draft. The two fans and the control of the draft in stack 7 by damper 7a should be so correlated in action that at 14 there is merely a sufficient tendency for the burnt gases in 23 to flow through 14 and join the gas in 5. Checker 5 completes the homogeneous admixture of the new hotter products of combustion with the cyclic flow of old cooler products of combustion. By a proper regulation of the fans and damper it is easy to form in 1 and in the rest of the system a pressure which is practically atmospheric, so there is no tendency for inward or outward leakage in 1.

The temperature plane of the gases passing through 1 can be maintained at any plane desired, this being merely a matter of adjusting the amount of gas vented off at 7 and the amount of new hot products of combustion added to replace it. With a 30 foot wrought-iron cylinder, about 6 feet in diameter, I find no difficulty in maintaining the temperature at the two ends of the container within 40 or 50° F., maintaining it, for example, in one installation at 650° F. at one end and 600° F. at the other.

In the cyclic flow of the inert atmosphere of products of combustion described, heat is constantly being removed at one point (in heating the material) and is being restored at another point in the cycle. The heat restored in the cycle must be enough to counterbalance that absorbed by the material being heated; and there must be a further amount of heat also to compensate for radiation losses, etc. In the described arrangement, this heat which must be added in the cycle is cheaply and economically obtained and the heat of a portion of the vented gases is utilized in the producer. Of course many other arrangements embodying the broad idea of this invention are possible. For example, the same body of products of combustion may be used indefinitely, the heat restored being through heating devices of any type located at a point in the cycle beyond the container for material. For example, the cooled gases may be run through tubes or tile exposed to a heating fluid, such as hot waste gases, or to combustion, as illustrated in Fig. 5. In other words, devices of the type of recuperators may be used in the circuit. The gases vented off may not be partly sent to a producer but may be all sent to waste and an ordinary gas producer or water gas generator be used. This arrangement however is not economical.

In Fig. 5 elements 1 and 2 are the same as in Figs. 1 and 2, but the somewhat cooled gases led away through conduit 6 and passing to fan or blower 9 are sent thence through conduit 50 to a special reheating device 51. In this reheating device the somewhat cooled gases go through a plurality of tiles or the like 52, which may be of any type customarily used in recuperators. As shown, these tile heating members are mounted in a chamber 53 supplied with flame gases or heating gases through inlet 54, such hot gases passing away from the chamber through outlet 55. After reheating the circulating body of gases is returned to the condenser through conduit 56. Portions of the circulating body of gas may be vented from time to time or continuously through valved outlet 57 and new gas supplied through valved inlet 58.

Bodies of inert gases produced in other manners may be used in lieu of producer gas, as for instance a circulating body of nitrogen which may be formed by passing air over hot copper or iron. Carbon dioxid may be used. But the products of combustion formed in the manner described are much the most advantageous. With special gases, like nitrogen, ordinarily the restoration of heat must be by heating through a wall in some portion of the circuit as by causing the circuit to pass through externally heated tubes of some type.

In lieu of the checker combustion chamber shown and described, any other device for producing combustion and homogenizing the products of combustion may be employed. For the mixer and homogenizer any other device may be employed in lieu of the checker chamber shown and described. The use of checker chambers for combustion and for homogenizing for the present purpose is, however, effective and desirable. So far as the homogenization of the gases in the cycle is concerned, the fan employed produces a good and intimate admixture. The second checker chamber shown however is desirable as admixing the new products of combustion with the old in a uniform way at once.

What I claim is:—

1. In heating, the process which comprises establishing and maintaining a flow of hot products of complete combustion in a closed circuit, such flow at one point passing through a container for the materials to be heated wherein it imparts heat to such materials and at another point passing through means for restoring the heat units disappearing in said circuit.

2. In heating, the process which comprises establishing and maintaining a flow of hot, chemically substantially inert products of combustion in a closed circuit, such flow at one point passing through a container for the materials to be heated wherein it imparts heat to such materials and at another point passing through means for restoring the heat units disappearing in said circuit.

3. In heating, the process which comprises establishing and maintaining a flow of hot, chemically substantially inert gases in a closed circuit, such flow at one point passing through a container for the materials to be heated wherein it imparts heat to such materials and at another point passing through means for restoring the heat units disappearing in said circuit.

4. In heating, the process which comprises establishing and maintaining a flow of hot products of combustion in a closed circuit including a container for the materials to be heated, a minor fraction of the flow being vented off beyond the container and a compensating amount of new hotter products of combustion being added to the flow prior to entering the container.

5. In heating, the process which comprises establishing and maintaining a flow of hot products of combustion in a closed circuit including a container for the materials to be heated, a minor fraction of the flow being vented off at a point beyond the container, another minor fraction being admixed with air and diverted through a gas producer to furnish gas, such gas being burnt and the products of combustion being added to the flow to compensate for the vented amount and to restore heat.

6. In heating, the process which comprises establishing a flow of hot products of combustion in closed circuit through a container for material to be heated and through a homogenizing device, a portion of the products of combustion being vented off from the flow between the container and the device and a compensating amount of fresh products of combustion being added to the flow in the homogenizing device.

7. The process of heating which comprises establishing a flow of hot products of combustion through a container in contact with the body to be heated, venting off a portion of the flow therebeyond, diverting another portion, admixing with air and transmitting through a gas producer to form gas, burning the gas to form new products of combustion, uniting the new products with the residue of said flow to compensate for the amount vented off and re-transmitting the flow into contact with said body.

8. The process of heating which comprises establishing a cyclic flow of products of combustion through a container for material to be heated and through a homogenizing device, a portion of the flow being vented off between the container and the device, diverting another portion and reconverting into gas in a producer, burning the gas in another homogenizing device, and transmitting the new products of combustion to the first-named device for admixture with the main flow.

9. In a heating apparatus, a container for materials to be heated, means for producing hot products of combustion, means for transmitting said products of combustion in cyclic flow to, through, beyond and back to said container and means for restoring to the flow at a point without the container the heat units disappearing in the flow.

10. In a heating apparatus, a container for materials to be heated, means for producing hot inert gases, means for transmitting said gases in cyclic flow to, through, beyond and back to said container and means for restoring to the flow at a point without the container the heat units disappearing in the flow.

11. In a heating apparatus, a container for materials to be heated, a homogenizing device, means for passing gases from the container to the device, said means including a venting means, means for adding a fresh portion of hot gases in the homogenizing device to replace vented gases and means for passing gases from the device back to the container.

12. In a heating apparatus, a container for materials to be heated having an inlet for hot products of combustion, means for removing cooled products of combustion therefrom, means for sending a portion of such cooled products to waste, means for mixing a fresh portion of hotter products of combustion with the residue of such cooled products and means for transmitting the mixture to said inlet.

13. In a heating apparatus, a container for material to be heated, a checker chamber, means for producing cyclic circulation of gases through container and chamber, means for venting a portion of the gases beyond the container, means for converting another portion into combustible gas and means for burning the gas and restoring the resulting hot products of combustion to the cyclic circulation.

14. In a heating plant, a heating chamber, an outlet conduit therefrom provided with venting means, means for causing a flow of gas in the conduit, a homogenizing checker chamber receiving gases from the conduit, means for introducing fresh hot gases into the checker chamber and conduit means leading gases from the checker chamber back to the heating chamber.

15. In a heating plant, a heating chamber, an outlet conduit therefrom provided with venting means, means for causing a flow of gases in the conduit, a gas producer, a branch conduit leading to the producer, a homogenizing checker receiving the residue of the gases from the checker, means for burning gas from the producer to form products of combustion, said means being in open communication with the checker and means for returning gas from the checker to the heating chamber.

16. In a heating plant, a heating chamber, an outlet conduit having venting means, fan means receiving gases from the conduit, a branched conduit beyond said fan, a gas producer having a draft inlet in communication with one branch of said conduit, a homogenizing chamber in communication with another branch, a second homogenizing chamber in communication with the gas outlet of said producer and also communicating with the first homogenizing chamber, means for burning the gas in the second homogenizing chamber to form products of combustion and means for leading gases from the first homogenizing chamber back to the heating chamber.

In testimony whereof, I affix my signature in the presence of two subscribing witnesses.

HENRY L. DOHERTY.

Witnesses:
L. R. WARREN,
THOS. I. CARTER.

Copies of this patent may be obtained for five cents each, by addressing the "Commissioner of Patents, Washington, D. C."